(12) United States Patent
Shostack et al.

(10) Patent No.: US 6,298,445 B1
(45) Date of Patent: Oct. 2, 2001

(54) COMPUTER SECURITY

(75) Inventors: Adam Shostack, Boston, MA (US); David Allouch, Givat Shimuel (IL)

(73) Assignee: Netect, Ltd. (IL)

( * ) Notice: Subject to any disclaimer, the term of this patent is extended or adjusted under 35 U.S.C. 154(b) by 0 days.

(21) Appl. No.: 09/070,698

(22) Filed: Apr. 30, 1998

(51) Int. Cl.$^7$ .................................................. G06F 12/14
(52) U.S. Cl. ......................................... 713/201; 713/200
(58) Field of Search .............................. 380/21; 713/200, 713/201, 202; 340/825.31, 825.34; 709/229, 235

(56) References Cited

U.S. PATENT DOCUMENTS

| | | | |
|---|---|---|---|
| 4,405,829 | 9/1983 | Rivest et al. | 178/22.1 |
| 5,361,359 | 11/1994 | Tajalli et al. | 395/700 |
| 5,557,346 | 9/1996 | Lipner et al. | 380/21 |
| 5,557,742 | 9/1996 | Smaha et al. | 395/186 |
| 5,557,765 | 9/1996 | Lipner et al. | 380/21 |
| 5,640,454 | 6/1997 | Lipner et al. | 380/21 |
| 5,684,957 | 11/1997 | Kondo et al. | 395/200.06 |
| 5,825,891 * | 10/1998 | Levesque et al. | 380/49 |
| 5,867,647 * | 2/1999 | Haigh et al. | 713/200 |
| 5,898,784 * | 4/1999 | Kirby et al. | 380/49 |
| 5,987,611 * | 11/1999 | Freund | 713/201 |
| 6,003,084 * | 12/1999 | Green et al. | 709/227 |
| 6,061,796 * | 5/2000 | Chen et al. | 713/201 |
| 6,219,652 * | 4/2001 | Carter et al. | 713/200 |

FOREIGN PATENT DOCUMENTS

0329415A2  2/1989  (EP) .................................. G06F/1/00

OTHER PUBLICATIONS

PR Newswire, Minneapolis, MN (Sep. 1995) "Network Systems and Haystack Labs Introduce Netstalker to Track Hacker Attempts" Accession No. 00531881 (3 pgs.).

PR Newswire, Atlanta, GA (Sep. 1995) "HP Selects NSC Borderguard Firewall Solution for Web Servers" Accession No. 00531230 (2 pgs.).

Business Wire, Lexington, MA (Oct. 1995) "Internet Security Signs Master Distributor Agreement with Bellcore, Will license Bellcore's SysGuard (TM) and Pingware (TM) Software Tools" Accession No. 00542376 (2 pgs.).

Business Wire, Las Vegas, NV (Apr. 1996) "WheelGroup to Demonstrate Real–Time Remote Network Monitoring Via Secure Virtual Private Networks on the Internet, Network Systems Corp. and Haystack Labs Products Combine to Create Secure Virtual Private Nets" Accession No. 00597652 (2 pgs.).

News Release, Vienna, VA (May 1996) "BTG Gains Exclusive Right to Offer Electronic Data Security System to Internet and Network Users in the Federal Market" Accession No. 00634843 (2 pgs.).

Business Wire, Vienna, VA (May 1996) "BTG Invests in WheelGroup's Information Protection System" Accession No. 00612063 (2 pgs.).

Business Wire, Alameda, CA (Jun. 1996) "New Firewall Technology from Ascend Substantially Lowers the Price of Remote Network Security; New Industry Price Point Makes Enterprise—Wide Security Viable" Accession No. 00627510 (3 pgs.).

(List continued on next page.)

*Primary Examiner*—James P. Trammell
*Assistant Examiner*—Pierre E. Elisca
(74) *Attorney, Agent, or Firm*—Hugh R. Kress; Winstead Sechrest & Minick (57) ABSTRACT

In one aspect, the invention relates to automatically providing enhancements to computer security software whenever the enhancement becomes available. In another aspect, the invention relates to an integrated system for assessing security vulnerabilities of a computer and/or a computer network.

14 Claims, 5 Drawing Sheets

OTHER PUBLICATIONS

Business Wire, Austin, TX (Jun. 1996) "Venrock Associates and Trellis Management Co. Invest in Haystack Labs' Website Security Technology" Accession No. 00624135 (2 pgs.).

Business Wire, Glenwood, MD (Oct. 1996) "Trusted Information Systems' Gauntlet Internet Firewall Passes NSA Test" Accession No. 00679353 (2 pgs.).

Business Wire, Alameda, CA (Oct. 1996) "Ascend's Secure Access Firewall Solution Receives NCSA Certification, Ascend's Intergrated Firewall Option for MAX and Pipeline Products Meets Rigorous NCSA Standards" Accession No. 00680964 (2 pgs.).

Business Wire, Austin, TX (Oct. 1996) "Haystack Labs Licenses Its Active Security Technology to Sun, Haystack Labs Awarded US Patent for its Intrusion Detection Software" Accession No. 00679097 (3 pgs.).

Business Wire, San Antonio (Nov. 1996) "WheelGroup and BTG Announce First Large–Scale Deployment of NetRanger™ Network Security Management System" Accession No. 00695074 (2 pgs.).

Business Wire, Austin, TX (Nov. 1996) "Haystack Labs Ships WebStalker–Pro 1.0" Accession No. 00695472 (3 pgs.).

Business Wire, Austin, TX (Dec. 1996) "Haystack Labs launches its Partner Program and Garners 10 Charter Members" Accession No. 00706659 (3pgs.).

Business Wire, New York, NY (Dec. 1996) "Haystack Labs unveils WebStalker–Pro NT, 'Beyond–the–Firewall' Security Product for Microsoft Windows NT" Accession No. 00707375 (3 pgs.).

Business Wire, Austin, TX (Dec. 1996) "Haystack Labs to Debut WebStalker for Windows NT and Present the "Top Ten Reasons Why a Firewall is Not Enough"" Accession No. 00705316 (2 pgs.).

PR Newswire, Comnet, WA (Feb. 1997) "Check Point Software and Haystack Labs Partner to Provide Advanced Suspicious Activity Monitoring Capabilities" Accesssion No. 00732995 (3 pgs.).

Business Wire, New York, NY (Mar. 1997) "Haystack Labs Appoints Former Security Dynamics Executive James M. Geary as President, Alisa Nessler as Vice President of Marketing" Accession No. 00748101 (3 pgs.).

Business Wire, Minneapolis, MN (May 1997) "StorageTek Network Systems Group, WheelGroup Thwart Hackers" Accession No. 00774595 (3 pgs.).

Business Wire, San Antonio, TX (May 1997) "WheelGroup Announces NetRanger for BorderGuard for Network Security Beyond Firewalls" Accession No. 00778276 (3 pgs.).

Business Wire, New York, NY (May 1997) Ernst & Young, LLP and WheelGroup Corp. Form Alliance to Provide Network Security Solutions. Accession No. 00784112 (2 pgs.).

Business Wire, El Segundo, CA (Jun. 1997) "Merisel Open Computing Alliance and Haystack Labs Inc. Offer Active Security–Product Suite, Provide New Level of Protection for Open Computer Systems" Accession No. 00788181 (2 pgs.).

Business Wire, Austin, TX (Jun. 1997) "Haystack Labs Announces Agreement with IBM to Resell WebStalker–Pro" Accession No. 00790002 (3 pgs.).

Business Wire, San Jose, CA (Jul. 1997) "Navigist Announces Network Security Review Service" Accession No. 00797507 (2 pgs.).

Business Wire, San Antonio, TX (Aug. 1997) "WheelGroup Releases NetRanger Version 2.0. Bringing Intrusion Detection to the Mainstream" Accession No. 00811341 (2 pgs.).

Ken Phillips, "Netective Nixes Ne'er–Do–Wells" Reprint from Aug. 4, 1997, PCWeek (4 pgs.).

NETECT "Company Profile" Tradeshow Pamphlet May 5–9, 1997 (7 pgs.).

Business Wire, San Antonio, TX (Oct. 1997) "WheelGroup Announces NetSonar Vulnerability Scanner, Best–of–Breed Consulting Expertise at Core of Product" Accession No. 00828916 (3 pgs.).

PR Newswire, Tampa, FL (Oct. 1997) "The Buy, Sell or Hold Company Starts Accent Software International with a Buy Rating" Accession No. 00824720 (4 pgs.).

PR Newswire, Glenwood, MD (Oct. 1997) "Trusted Information Systems, Inc. to Acquire Haystack Laboratories, Inc." Accession No. 00820649 (3 pgs.).

Pr Newswire, Cedar Grove, NJ (Dec. 1997) "Right to Privacy for Sale in Cyberspace, SynData Technologies Inc. Speaks Out Against Key Recovery" Accession No. 00835722 (2 pgs.).

Business Wire, Santa Clara, CA (Dec. 1997) "Network Associates Offers Web–Based Training on Sniffer Basics, Anytime, Anywhere Learning Through a Browser." Accession No. 00837415 (2 pgs.).

NETECT Inc. "Network Associates Teams with NETECT to Deliver Security Updates via the Internet" Press Release San Francisco, CA Jan. 13, 1998 (2 pgs.).

Business Wire, San Mateo, CA (Jan. 1998) "Keynote Systems to Add Remote Internet Performance Measurements to Network Associates WebSniffer: First OEM Relationship for Keynote Systems Perspective" Accession No. 00848145 (3 pgs.).

PR Newswire, Santa Clara, CA (Jan. 1998) "Network Associates Releases New Version of PC Medic—The First PC Diagnostic, Repair Product Integrated with Help Desk Technology" Accession No. 00845704 (3 pgs.).

PR Newswire, Washington, D.C. (Jan. 1998) "Network Associates Announces Industry's First and Only Distributed, Enterprise ATM Management System" Accession No. 00848419 (3 pgs.).

Business Wire, San Jose, CA (Feb. 1998) "Cisco Systems to Acquire WheelGroup Corporation, Cisco Extends Leadership in End–To–End Network Security Products." Accession No. 00857535 (2 pgs.).

PR Newswire, New York, NY (Feb. 1998) "Think Named Global Marketing and Communications Company of Record for Network Associates" Accession No. 00857760 (3 pgs.).

WheelGroup Corporation; Web Site (www.wheelgroup-.com), 2 pages printed on Mar. 12, 1998.

WheelGroup Corporation, Web Site (www.wheelgroup-.com/about/about.html), 8 pages printed on Mar. 12, 1998.

PR Newswire, Santa Clara, CA (Mar. 1998) "Network Associates Nuts & Bolts Wins PC Magazines Editor's Choice Award for Best Troubleshooting Utility" Accession No. 00863088 (2 pgs.).

PR Newswire, Santa Clara, CA (Mar. 1998) "Network Associates Launches Nuts & Bolts Deluxe with One of the Industry's First Year 2000 Hardware Fix Capabilities" Accession No. 00863089 (3 pgs.).

PR Newswire, Holmdel, NJ (Mar. 1998) "Updata Capital Co–Manages Merger of Trusted Information Systems (TIS) and Network Associates, Inc." Accession No. 00863686 (2 pgs.).

Common Gateway Interface, Web Site (http://hoohoo.ncsa.uiuc.edu/cgi/intro.html) 2 pages printed on Mar. 10, 1998.
Attack Pathology, Web Site (http://www.geek–girl.com/ids/0443.html), 3 pages printed on Mar. 12, 1998.
What SATAN is, Web Site (www.cs.ruu.nl/cert–uu/satan.html) 3 pages printed on Mar. 12, 1998.
Pingware info—was "Re: newbie intro", Web Site (http://www.geek–girl.com/ids/0325.html), 1 page printed on Mar. 12, 1998.
Security Administrator's Tool for Analyzing Networks, Web Site (www.fish.com/satan/) 3 pages printed on Mar. 12, 1998 with a copyright date of 1995.
About Axent, Web Site (http://www.axent.com/about/about.htm) 1 page printed on Mar. 12, 1998 with a copyright date of 1997.
Axent Company Overview. Web Site (www.axent.com) 2 pages printed on Mar. 12, 1998.
Axent Corporate Overview, Web Site (www.axent.com) 1 page printed on Mar. 12, 1998.
OmniGuard/ESM, Web Site (www.axent.com/product/esm/esm.htm) 10 pages printed on Mar. 12, 1998.
OmniGuard/ESM Brochure, Web Site (www.axent.com/product/esm/esm1.htm) 5 pages printed on Mar. 12, 1998.
OmniGuard/Intruder Alert, Web Site (www.axent.com/product/ita/its.htm) 10 pages printed on Mar. 12, 1998.
OmniGuard/URM UNIX Resource Manager, Web Site (www.axent.com/product/eacu/eacu.htm) 2 pages printed on Mar. 12, 1998.
OmniGuard/URM Brochure Enterprise Resource Manager, Web Site (www.axent.com/product/erm/erm2.htm) 5 pages printed on Mar. 12, 1998.
OmniGuard/URM Brochure UNIX Resource Manager, Web Site (www.axent.com/product/eacu/eacu1.htm) 4 pages printed on Mar. 12, 1998.
OmniGuard/PCShield, Web Site (www.axent.com/product/pcs/pcs.htm) 3 pages printed on Mar. 12, 1998.
OmniGuard/PCShield Brochure, Web Site (www.axent.com/product/pcs/pcs1.htm) 4 pages printed on Mar. 12, 1998.
Haystack Labs TIS, Web Page (www.haystack.com) 1 page printed on Mar. 12, 1998.
OmniGuard UPM UNIX Privilege Manager, Web Site (www.axent.com/product/upm/upm.htm) 2 pages printed on Mar. 12, 1998.
OmniGuard/UPM Brochure UNIX Privilege Manager, Web Site (www.axent.com/product/upm/upm2.htm) 3 pages printed on Mar. 12, 1998.
OminGuard/Defender Secure Authentication Solution, Web Site (http://www.axent.com/product/def.htm) 1 page printed on Mar. 12, 1998; copyright 1997.
OmniGuard/Defender Brochure Secure Authentication Solution, Web Site (www.axent.com/product/def2.htm) 5 pages printed on Mar. 12, 1998.
OmniGuard/Power VPN Power Virtual Private Network, Web Site (http://www.axent.com/product/vpn/vpn.htm) 1 page printed on Mar. 12, 1998 with a copyright date of 1997.
OmniGuard/Power VPN Brochure Power Virtual Private Network, Web Site (http://www.axent.com/product/vpn/vpn1.htm) 5 pages printed on Mar. 12, 1998 with a copyright date of 1997.
System Security Scanner Datasheet, Web Site (http://iss.net/prod/s3ds.html) 4 pages printed on Mar. 12, 1998; copyright 1997.
RealSecure Datasheet, Web Site (http://iss.net/prod/rsds.html) 4 pages printed on Mar. 12, 1998; copyright 1997.
Internet Scanner Datasheet, Web Site (http://iss.net/prod/isds.html) 4 pages printed on Mar. 12, 1998; copyright 1997.
ISS Product Literature, Web Site (http://iss.net/prod/datashts.html) 1 page printed on Mar. 12, 1998; copyright 1994–1998.
ISS in the News, Web Site (http://www.intsysserv.com/body_default.htm) 1 page printed on Mar. 12, 1998.
Welcome to ISS Online, Web Site (http://www.isscorp.com) 1 page printed on Mar. 12, 1998; copyright 1998.
ISS Products: Software Solutions, Web Site (http://www.isscorp.com/products.html) 2 pages printed on Mar. 12, 1998; copyright 1998.
About Haystack Labs, Web Site (http://www.haystack.com/about.htm) 1 page printed on Mar. 12, 1998.
Haystack Labs Company Background, Web Site (http://www.haystack.com/background.htm) 1 page printed on Mar. 12, 1998.
Haystack Laboratories Copyright and Trademarks, Web Site (http://www.haystack.com/trademar.htm) 1 page printed on Mar. 12, 1998.
Haystack Laboratories Company Timeline, Web Site (http://www.haystack.com/timeline4.htm) 1 page printed on Mar. 12, 1998.
Haystack Labs Products, Web Site (http://www.haystack.com/products.htm) 1 page printed on Mar. 12, 1998.
WebStalker, Web Site (http://www.haystack.com/webstalk.htm) 2 pages printed on Mar. 29, 1998.
WebStalker–Pro Tour, Web Site (http://www.haystack.com/wstour.htm) 2 pages printed on Mar. 29, 1998.
WebStalker–Pro, Web Site (http://www.haystack.com/ws_demo/htm/home.htm) 1 page printed on Mar. 12, 1998 with a copyright date of 1993–96.
Sample the WebStalker Pro Interview, Web Site (http://www.haystack.com/sample.htm) 1 page printed on Mar. 12, 1998.
Stalker Product, Web Site (http://www.haystack.com/stalk.htm) 1 page printed on Mar. 12, 1998.
Stalker Key Features, Web Site (http://www.haystack.com/s–feature.htm) 2 pages printed on Mar. 12, 1998.
Stalker Product Details, Web Site (http://www.haystack.com/s–detail.htm) 1 page printed on Mar. 12, 1998.
Stalker Tracer/Browser, Web Site (http://www.haystack.com/tracer.htm) 2 pages printed on Mar. 29, 1998.
Stalker Misuse Detector, Web Site (http://www.haystack.com/misuse.htm) 1 page printed on Mar. 12, 1998.
Stalker Audit Control, Web Site (http://www.haystack.com/s–audit.htm) 1 page printed on Mar. 12, 1998.
Stalker Storage Manager, Web Site (http://www.haystack.com/s–manage.htm) 1 page printed on Mar. 12, 1998.
What's New at Haystack Labs, Web Site (http://www.haystack.com/watnu.htm) 2 pages printed on Mar. 12, 1998.
Navigational Bar for Haystack Labs, Web Site (http://www.haystack.com/map.htm) 1 page printed on Mar. 12, 1998.
Security Issues, Web Site (http://www.haystack.com/satan.htm) 3 pages printed on Mar. 12, 1998.
Distributors, Web Site (http://www.haystack.com/distrib.htm) 1 page printed on Mar. 12, 1998.
Network Associates: Main Index, Web Site (http://www.netassociates.com/main.htm?) 1 page printed on Mar. 12, 1998 with a copyright date of 1997.

Network Associates: Technical Links, Web Site (http://www.netassociates.com/Resources/TechLinks.htm) 2 pages printed on Mar. 12, 1998; copyryright 1997.

Micah Development's—Full Armor Access Control Software, Web Site (http://www.fullarmor.com/) 1 page printed on Mar. 12, 1998.

Full Armor Prducts by Micah, Web Site (http://www.fullarmor.com/products/index.html) 3 pages printed on Mar. 12, 1998; copyright 1996, 1997 Micah Development Corporation.

Network Associates: Desktop Management, Web Site (http://www.netassociates.com/Resources/Software/SoftDesk.htm) 1 page printed on Mar. 12, 1998; copyright 1997.

Network Associates: Virus Detectors Web Site (http://www.netassociates.com/Resources/Software/SoftVirus.htm) 1 page printed on Mar. 12, 1998; copyright 1997.

Network Associates Valuable Free Software & Demos, Web Site (http://www.netassociates.com/Resources/Software/SoftValuable.htm) 1 page printed on Mar. 12, 1998; copyright 1997.

Network Associates: The Networking Company, Web Site (www.netassociates.com) 1 page printed on Mar. 30, 1998.

Products, Web Site (http://www.axent.com/product/products.htm) 1 page printed on Mar. 16, 1998; copyright 1997–98.

OmniGuard/Intruder Alert, Web Site (http://www.axent.com/product/ita/ita.htm) 9 pages printed on Mar. 16, 1998; copyright 1998.

How Secure is the Information on Your Computer System?, Web Site (http://www.axent.com/product/overview/corporate.htm) 12 pages printed on Mar. 16,1998; copyright 1997.

OmniGuard/ESM Enterprise Security Manager, Web Site (http://www.axent.com/product/esm/esm.htm) 10 pages printed on Mar. 16, 1998; copyright 1997.

OmniGuard/ESM Brochure Enterprise Security Manager, Web Site (http://www.axent.com/product/esm/esm1.htm) 5 pages printed on Mar. 16, 1998; copyright 1997.

OmniGuard/ESM Enterprise Security Manager Web Site, (http://www.axent.com/support/techsup/esmupd.htm) 4 pages printed on Mar. 16, 1998; copyright 1997.

OmniGuard/Intruder Alert Brochure, Web Site (http://www.axert.com/product/ita/ita1.htm) 4 pages printed on Mar. 16, 1998; copyright 1998.

OmniGuard/ERM Enterprise Resource Manager, Web Site (http://www.axent.com/product/erm/erm.htm) 1 page printed on Mar. 12, 1998; copyright 1997.

OmniGuard/NetReconWeb Site (http:www.axent.com/netrecon/) 3 pages printed on Mar. 16, 1998; copyright 1997–1998.

OmniGuard/NetRecon Brochure, Web Site (http://www.axent.com/netrecon_brochure.htm) 6 pages printed on Mar. 16, 1998; copyright 1997–1998.

Netect Products, Web Site (www.netect.com/product.htm) 5 pages printed on Mar. 30, 1998; copyright 1997.

Spangler, T. "Netective Emulates Network Attacks, Hacker Methods" (http://www.netect.com/artic104.htm) 2 pages printed on Apr. 29, 1998.

Network Associates Teams with NETECT to Delivery Security Updates Via the Internet, Web Site (http://netect.com/news06.htm) 2 pages printed on Mar. 30, 1998; copyright 1997.

NETECT Demonstrates that Encryption Alone Can Not Protect Against Cyberthreats, Web Site (http://www.netect.com/news05.htm) 2 pages printed on Mar. 30, 1998; copyright 1997.

NETECT Delivers First Single–Product Solution for Protecting Networks from Internal and External Cyberthreats, Web Site (http://www.netect.com/news04.htm) 2 pages printed on Mar. 30, 1998; copyright 1997.

NETECT Delivers OPSEC—Enabled Security Technology to Work with Check Point Firewall–1, Web Site (http://www.netect.com/news01.htm) 2 pages printed on Mar. 30, 1998; copyright 1997.

Intruder–Attack Simulators, Web Site (http://www.netect.com/articl05.htm) 2 pages printed on Mar. 30, 1998; copyright 1997.

Netective's On the Case For Security, Web Site (http://www.netect.com/articl103.htm) 1 page printed on Mar. 30, 1998; copyright 1997.

Netect's Netective Simulates Hacker Attacks, Letting Corporate Networkers Shore Up Weak Spots, Web Site (http://www.netect.com/articl07.htm) 2 pages printed on Mar. 30, 1998; copyright 1998.

HTML Documents: A Mosaic Tutorial, Web Site (http://sti.larc.nasa.gov/demos/html_tutorial.html) 16 pages printed on Apr. 7, 1998; copyright 1997.

FTP Tutorial, Web Site (http://www.paccd.cc.ca.us/instadmn/physcidv/ftp_tutr.htm) 4 pages printed on Apr. 7, 1998.

Internet World Dec. 1997—Suite Decisions, Web Site (http://search.internet.com/plweb-c...netWorld+718+3+wAAA+push%26channel) 7 pages printed on Apr. 9, 1998; copyright 1997.

What is IMAP, Web Site (http://www.imap.org/whatisIMAP.html) 1 page printed on Apr. 9, 1998; copyright 1996–1998.

Detecting Net Trouble Spots, Web Site (http://www.netect.com/articl02.htm) 2 pages printed on Mar.30, 1998; copyright 1997.

Update: Push Channel Pays Dividend As Marketing Tool For Software Maker, Web Site (http://www.internetworld.com/print.../07/21/markcomm/19970721–push.html) 1 page printed on Apr. 9, 1998.

Comparing Two Approaches to Remote Mailbox Access: IMAP vs. POP, Web Site (http://www.imap.org/imap.vs.pop.brief.html) 4 pages printed on Apr. 9, 1998; copyright 1996.

Message Access Paradigms and Protocols, Web Site (http://www.imap.com/imap.vs.pop.html) 10 pages printed on Apr. 9, 1998; copyright 1996.

MD5 Checksum Utility, Web Site (http://www.threel.co.uk/tech/tools/md5.htm) 1 page printed on Apr. 10, 1998.

Frequently Asked Questions, Web Site (http://hoohoo.ncsa.uiuc.edu/docs/FAQ.html#whatis) 5 pages printed on Apr. 10, 1998.

How does PGP authentication Work?, Web Site (http://kekec.e5.ijs.si/security/efh/howauth.html) 1 page printed on Apr. 10, 1998.

RSA Algorithm Javascript Page, Web Site (wysiwyg://4/http://www.engr.orst.edu.~makmur/HCproject/) 2 pages printed on Apr. 11, 1998.

Digital Signatures, Web Site (http://csrc.ncsl.nistpubs/800–7/node211.html) 2 pages printed on Apr. 11, 1998.

Authentication: The Key to Internet Security, Web Site (http://www.cs.rpi.edu/~noel/Security/Authenticate.html) 2 pages printed on Apr. 11, 1998.

Question 143. What are Identification Schemes and Authentication Protocols?, Web Site (http://www.rsa.com/rsalabs/newfaq/q143.html) 1 page printed on Apr. 11, 1998; copyright 1996.

Question 3. What is Public–Key Cryptography? Web Site (http://www.rsa.com/rsalabs/newfaq/q3.html) 2 pages printed on Apr. 11, 1998; copyright 1996.

rfc 1321, Web Site (http://www.cis.ohio–state.edu/htbin/rfc/rfc1321) 18 pages printed on Apr. 12, 1998.

WindowsNT Bonk Update, Web Site (http://www.ndsu.nodak.edu/csg/info/bonknt.html) 2 pages printed on Apr. 14, 1998.

Craig, A., New Tools Make Hackers Lives Easy, Web Site (wysiwyg://60/http://www.crystosoft.com/snews/dec97/24129700.htm) 2 pages printed on Apr. 14, 1998; copyright 1995–1998.

Denial of Service or "Nuke" Attacks, Web Site (http://deckard.mc.duke.edu/irchelp/nuke/) 2 pages printed on Apr. 14, 1998; copyright 1996–1997.

User Datagram Protocol, Web Site (http://www.alexia.net.au/~www/yendor/internetinfo/udp.html) 3 pages printed on Apr. 14, 1998.

Syn Flood, Web Site (http://www.axent.com/swat/1attacks/unix/generic/synflood.htm) 1 page printed on Apr. 14, 1998.

Phrack Magazine, Web Site (http://www.fc.net/phrack/files/p48/p48–13.html) 20 pages printed on Apr. 14, 1998.

Outsmarting Intruders, Web Site (http://www.netect.com/plug.htm) 1 page printed on Apr. 15, 1998; copyright 1997.

Channel Definition Format (CDF), Web Site (http://www.w3.org/TR/NOTE–CDFsubunit.html#Introduction) 12 pages printed on Apr. 17, 1998; copyright 1997.

Electronic Mail re: PRNewswire "Network Guardians Introduces Java–based Network Security Scanner" 2 pages; copyright 1998.

Electronic Mail re: The Digital Commerce Society of Boston Presents "No Silver Bullet" Digital Commerce and Payment Security, Apr. 7, 1997 at the Downtown Harvard Club of Boston (4 pgs.).

Electronic Mail re: "Everything You Ever Wanted to Know About Security Holes, for a Price" printed on Apr. 13, 1998 (1 pg.).

* cited by examiner

COMPUTER SECURITY

TECHNICAL FIELD

This invention relates generally to computer security software and systems.

BACKGROUND INFORMATION

The rapid development of intranets, extranets and the internet has introduced an increased level of security problems for network managers, computer information systems professionals, individual users, and corporations with an expanding base of telecommuters. With the advent of electronic mail and electronic commerce via the internet, computer information security is an increasing worldwide concern. The responsibilities of system administrators to provide and monitor network connections for security breaches has substantially increased. Furthermore, with the rapid increase of new computer users and the constant development of sophisticated techniques for breaching established network security systems, system administrators are unable to provide their clients and servers with adequate protection. As a result, computer network systems have become increasingly vulnerable to attacks.

In an attempt to prevent unwanted access to computer networks, systems administrators have employed various techniques. One such technique employs a firewall to protect the network clients and servers. A firewall is a screen between a user external to the network and the network and is usually the first line of defense against unauthorized users seeking access to a network. The firewall behaves much like an electronic filter that determines whether a particular user has the requisite security clearance to gain access to the network or computer. As an initial defense, the firewall generally provides adequate protection. However, depending upon the concentration of network traffic, quality of the firewall, and the sophistication, skill and motivation of the person seeking access, the firewall becomes vulnerable to attack. Furthermore, firewalls are designed to prevent unauthorized external access and do not prevent internal users from breaching network security.

In addition, there are products available in the public domain directed to uncovering security vulnerabilities within networks. Although the software tools are not explicitly designed for use by hackers, the tools may be used to gain unauthorized access to a network. For example, a software tool that is widely available is the system administrator tool for analyzing networks (SATAN). This software tool may be used to probe for security holes within a network and highlight network vulnerabilities. An intruder is then able take advantage of the information obtained from SATAN to gain unauthorized access to a network.

The list of network vulnerabilities is always changing and usually well known by hackers. Over the years, hackers have developed many techniques for breaching computer security. Many of the techniques often involve exploiting the vulnerabilities associated with particular software packages. For example, hackers are aware of vulnerabilities in software programs like electronic mail (e-mail), software features like remote login (rlogin), or security weaknesses in particular word processing programs, and they use this information to gain unauthorized access to a network or computer.

One technique used by hackers to breach computer network security is Internet Protocol spoofing (IP spoofing). Using this technique, an unauthorized user gains access to a network by hiding their true location and masking their Internet Protocol (IP) address or root address. In doing so, the IP address appears acceptable to a network server and the unauthorized user is granted access to the network.

Another known method for breaching network security is the buffer overflow technique. Hackers use this technique to gain access to a network through insecure implementation of a file in a file transfer protocol (FTP) server, an electronic mail system, a network file server (NFS), or through a common gateway interface (CGI). The buffer is essentially a temporary holding place in memory with a fixed size for processing computer programs and a hacker may cause too much information to be placed in a buffer. When the buffer is beyond its capacity, an overflow occurs. The overflow is then sent to another part of memory within a server. The hacker is then able to gain privileged access to the computer from inside the new location in memory, and as a result, security is breached.

Whenever an unauthorized user breaches network security and is allowed free access to the system, the damage that might result is unpredictable. However, because some of the system vulnerabilities and techniques used by hackers are known, a system administrator may use that information to make the network less vulnerable to attack. However, the system administrator is required to remain constantly vigilant as to the new attacks being used by hackers, and then use that information to protect the network, clients and servers from the newly found vulnerability.

SUMMARY OF THE INVENTION

While some system administrators may be equipped with software packages that assist them in providing security for their networks, updates to those software packages typically are not automatically provided in real-time, nor are they provided as soon as a new vulnerability is discovered. One aspect of the present invention is that it automatically provides, in real-time, software enhancements with-updated information regarding security vulnerabilities. Thus, a user, system administrator, server, etc. is able to implement prevention techniques before a security breach occurs. In accordance with this aspect of the invention, the enhancement that was sent is then integrated into the computer security software. Before the integration, a computer check can be performed to determine the integrity and the authenticity of the enhancement. The computer check can use cryptographic techniques such as digital signatures and Pretty Good Privacy™ (PGP™) encryption.

In one aspect, the invention provides the most recent information regarding new security attacks. A user can either request the enhancement, or it can be automatically sent (e.g., via the internet) when it becomes available. The software enhancement can include a new version of the software and an update to a database of known security vulnerabilities. A user thus can obtain instant access to the latest security vulnerabilities and employ immediate remedial action before a security breach occurs. Thus, systems and methods according to the invention are not bounded by a static database of security vulnerabilities information. The present invention obviates the need to manually update a computer security system.

In another aspect, the invention relates to a network security detector that is used to monitor security intrusions on a network. The network security detector (NSD) may consist of a single software application dedicated to continuously scanning the network. However, in the disclosed invention the NSD consists of a first application that provides real-time intrusion detection; a second application that behaves like a system manager; a third application that is able to simulate attacks on the network and monitor Internet Protocol devices; a fourth application that performs a comprehensive security assessment of the network; and a fifth application responsible for receiving the software enhancements.

In another aspect, the invention relates to an integrated system for assessing vulnerabilities. The integrated system includes a database of security vulnerabilities and various modules. A first module accesses the database and assesses security vulnerabilities of an operating system of a computer. A second module accesses the database and assesses security vulnerabilities of a computer network that includes the computer. A third module accesses the database and assesses security vulnerabilities in passwords used to access the computer or the network. A fourth module accesses the database and assesses security vulnerabilities of a remote computer connected to the network. A fifth module receives an update to the database and updates the database. A sixth module is a communications module that allows communication between the integrated system and a similar system.

In yet another aspect of the invention, the invention involves an integrated system for assessing vulnerabilities, including a first module for assessing security vulnerabilities of an operating system of a computer, and a second module for assessing security vulnerabilities of a computer network that includes the computer. The system can also include a database of security vulnerabilities, a third module for accessing the database and for assessing security vulnerabilities in passwords used to access the computer or the network, a fourth module for accessing the database and for assessing security vulnerabilities of a remote computer connected to the network, and a fifth module for receiving an update to the database and updating the database.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

In accordance with the invention, a database of security vulnerabilities is automatically updated via an electronic network. The database is part of a computer security software system. The automatic update can occur whenever a software enhancement becomes available. The update can then be integrated into the computer security software. New and different security vulnerabilities are discovered almost daily. As a result, computer security checks should employ a flexible mechanism able to adapt to newly discovered security vulnerabilities. The present invention provides such a mechanism by automatically providing enhancements to a database of security vulnerabilities and using that information to provide security solutions to potentially "weak" computer networks and/or computers.

Figures 1, 2:
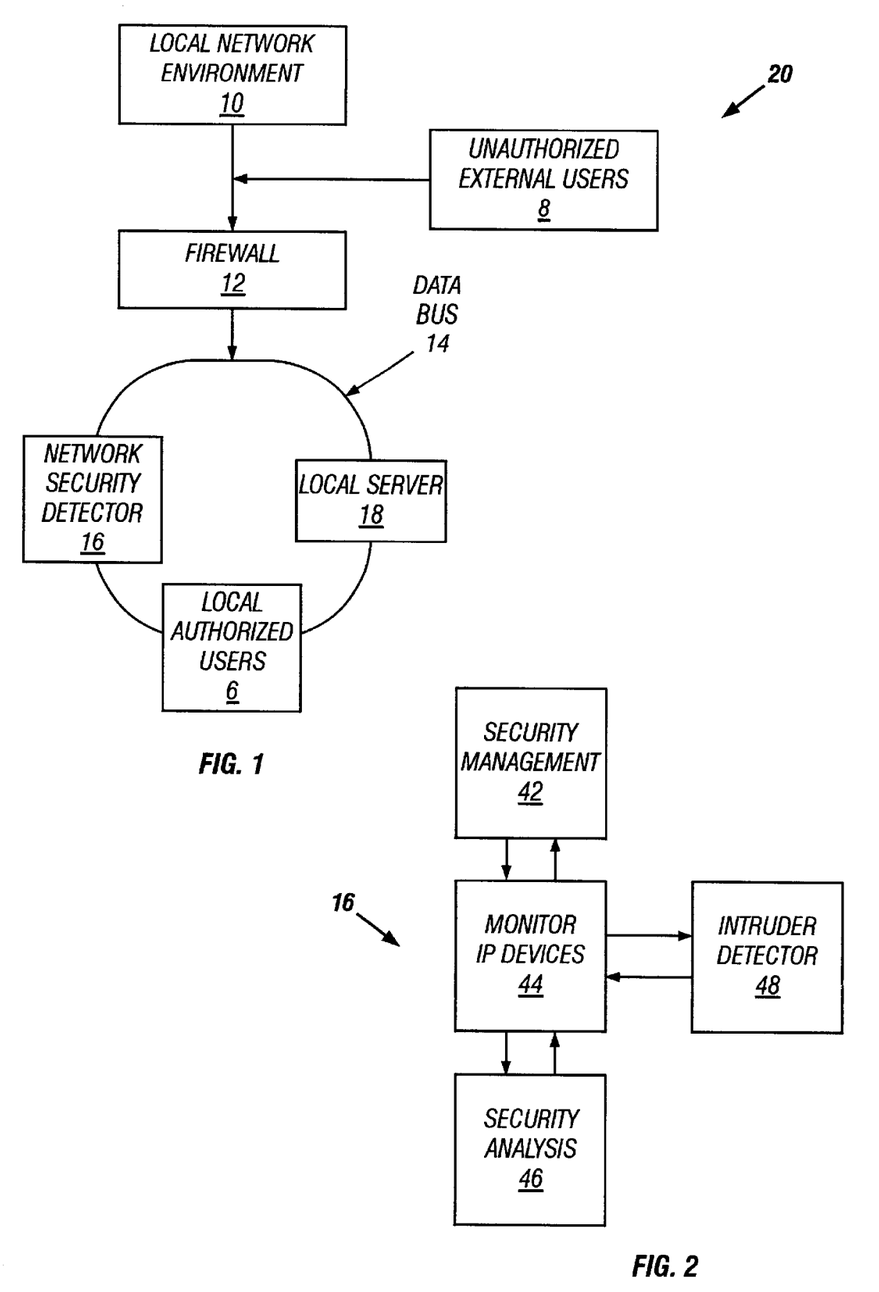
FIG. 1 is a schematic diagram of a computer network.
FIG. 2 is a schematic diagram of the network security detector for providing security on a local area network.

Referring to FIG. 1, a network includes a local network environment 10, a data bus 14 for electronically linking various ports of the network, a local server 18, a network security detector (NSD) 16, and a firewall 12 for screening unauthorized external users 8. The local network environment 10 includes connections to the internet and routers for connecting authorized remote locations. System administrators can create a secure environment by using the firewall 12 and supplementing it with the network security detector 16.

The firewall 12 is an electronic filter used to prevent unauthorized external users 8 from accessing the network 20 without permission. The network security detector 16 ascertains whether unauthorized external users 8 and authorized local users 6 possess the requisite security clearance to access certain areas within the network 20. The network security detector 16 can be used to prevent both unauthorized external users 8 and authorized local users 6 from unauthorized access to the local server 18. The firewall 12 and/or the NSD 16 may be subject to attack.

The network security detector 16 can be electrically connected to a database of security vulnerabilities which may be stored on the local server 18. However, in another embodiment of the invention, a database of security vulnerabilities is stored on the individual computers of the authorized local users 6 or at a remote location not local to the network 20. The database of security vulnerabilities includes a list of techniques used by hackers to gain unauthorized access to the network 20 and includes a catalog of known security weaknesses in software programs stored on the network 20. In one embodiment of the invention, the database of security vulnerabilities is used in conjunction with the network security detector 16 to provide security for the network 20.

As previously mentioned, the list of computer and network vulnerabilities is always changing and growing, and over the years, hackers have developed many techniques for breaching computer security. Table 1 is a list of some of the known features that hackers have used to gain access to computer networks. Table 1 lists common vulnerabilities found on the network 20 that might be exploited. Although the firewall 12 is normally the first line of defense against an attack on the network 20, the firewall 12 can be circumvented using many techniques, such as IP spoofing and other types of attacks discussed below.

Table 1 shows that features often provided for the convenience of authorized network users may be exploited by hackers or unauthorized external users 8 to access the network 20. For example, in UNIX™, finger is a feature that allows authorized local users 6 to locate other users on the network 20, or netstat is used to obtain information regarding network status. However, an individual motivated to breach network security may use these features to gather information about valid users (such as internet addresses) and then use that information to gain unauthorized access to the network 20. Hackers may also gain unauthorized access by using programs stored on the network 20 like sendmail and X-windows™ that may allow access to program libraries or give out too much information about authorized network users.

Another avenue onto the network 20 is through a daemon which is a program intended to provide useful services that is not explicitly invoked but lies dormant waiting for some condition on the network 20 to occur. The idea is that the perpetrator of the condition need not be aware that a daemon is lurking although a program may commit an action only to invoke the daemon. For example, printing a file may first invoke the daemon for spooling and then print the file. Another daemon is the hypertext transfer protocol daemon (HTTPD) which is a program used to provide information for the world wide web. However, unless configured properly, the path through an HTTPD may also allow unauthorized external users 8 through the firewall 12 and onto the network 20.

Depending upon the motivation of the unauthorized external user 8, the attack may consist of placing a disruption on the system that limits access and not necessarily removing or copying secret documents. Methods for limiting processing on the network 20 are called denial of service attacks. Some techniques used to deny service is called the teardrop and land attack where a hacker sends pairs of carefully constructed IP fragments to a network server. The IP fragments trigger bugs in computer programs or network logic. The overlapping offsets cause the second packet to overwrite data in the middle of the user datagram protocol (UDP) header in such a way that the datagrams are left incomplete. When a software program then reads the invalid datagrams, the program allocates kernel memory, and if enough of the invalid datagrams are received, then the software program is indefinitely suspended.

There are several other commonly used attacks that produce the aforementioned result namely UDP bombs, ping floods, and SYN floods. SYN represents the synchronizing bit that indicates to a server that a client is seeking access. The SYN flood attack bombards a system with dozens of falsified connection requests a minute and can seriously degrade a system's ability to give service to legitimate connection requests. Accordingly, the attack is said to "deny service" to system users. In addition, a hacker may use some of the preceding techniques to store programs on the network 20 that could be used to gain access at a later time. That is, the hacker builds a backdoor or trap door onto the network 20 that might go undetected, and as a result this enables the hacker to exploit the network 20 at any given time.

TABLE 1

An example of the type of information contained in a security vulnerabilities database.

| Feature | Vulnerability |
| --- | --- |
| Firewall | Check the firewall for vulnerability to routing, IP spoofing, and other attacks. |
| Information Gathering | Check for finger, rusers, netstat, and many other sources of network information that is useful during an attack. |
| Sendmail | Check for historical vulnerabilities in sendmail and misconfigurations that may give out too much information or allow outsiders in. Also check for buffer overflows that allow local users to gain root. |
| File Transfer Protocol (FTP) | Check for world-writable directories, insecure files inside the FTP sandbox, and other attacks that may crash the server, plant backdoors into the system, or allow users to escape the FTP sandbox. |

TABLE 1-continued

An example of the type of information contained in a security vulnerabilities database.

| Feature | Vulnerability |
| --- | --- |
| Network File Server | Check for insecure shares, filehandle guessing, and other common misconfigurations that allow outsiders to see the disks or create backdoors to the system. |
| HyperText Transfer Protocol Daemon and Internet Information Server (HTTPD and IIS) | Check for known bugs in the servers, commonly present CGI scripts that are vulnerable to buffer overflow attacks, server misconfigurations, and other vulnerabilities that allow outsiders to escape the server sandbox, gain root or user access to the system, or crash the server or system. |
| Miscellaneous Daemon | Check for the presence of network services that are inherently insecure, such as telnetd, walld, tfpd, and many others. |
| X-windows ® | Check for open permissions that allow snooping of remote X sessions, unpatched libraries and executables vulnerable to buffer overflow attacks, and other well-known X vulnerabilities. |
| Denial of Service Attacks | Check for vulnerability to all common attacks SYN Floods, UDP Bombs, Ping Floods, and others, plus newer attacks like Land and Teardrop. |
| Home | Checks home directory for world writeability. |
| System | Checks for read/write files in the configuration files. |
| Password | Checks for /etc/passwd, easy guessable passwords. |
| Configuration Files Check | Look for common misconfigurations in various files like inetd.conf, .rhosts, host.equiv, and many others. |
| Users | Checks for home directory important files with insecure permissions and pays special attention to root's files. |
| Backdoors | Checks for possible backdoors in the system binaries and configuration files. |
| Patches | Checks for the presence of all Sun ® security. |

The Network Security Detector (NSD)

As previously mentioned, the firewall 12 is often the first line of defense against some of the aforementioned security attacks on the network 20. However, according to the invention, another layer of defense involves the use of a security network detector 16. In one embodiment of the invention, the network security detector 16 includes software programs that seek to uncover security intrusions. In one embodiment of the invention, the network security detector 16 is a single package that continuously scans the network for violators. In another embodiment of the invention, the network security detector 16 is an integrated family of software packages that individually resolve various security issues. Referring to FIG. 2, the network security detector 16 has various components. In one embodiment of the network security detector 16, it has at least four integrated software applications for providing network security.

A first application 48 of the NSD 16 provides a real-time intrusion detection notification system. In one embodiment, the first application 48 takes an action which may include sending an alarm to a system administrator if an intrusion is detected. In addition, the first application 48 electronically disengages the intruder and marks the intruder's location. The first application 48 can also distribute to each computer on the network 20 information about network status. The first application 48 can watch each site location and electronically communicate with a system manager, or his programmatic agent. The system manager can be a system administrator. However, the system manager could be another software program in electrical communication with the first application 48.

A second application 42 of the NSD 16 can include the system manager for receiving information from the first application 48. In this capacity, the system manager assists the system administrator in providing network security information and assists in managing the security of numerous port connections associated with the network 20.

A third application 44 of the NSD 16 can provide continuous monitoring of the complete network 20. The third application 44 is in electronic communication with the other applications and may be used as a system management tool. However, in the disclosed embodiment, the third application 44 is used to monitor Internet Protocol devices.

In another aspect of the invention, the third application 44 can also simulate an attack on the network 20. The simulation can provide information to the network security detector 16 for uncovering potential security vulnerabilities before the vulnerabilities are exploited. The third application 44 may also check the local server 18 for security vulnerabilities. In addition, the third application 44 provides a map of all ports on the network 20 and pings all Internet Protocol devices to expose potential security vulnerabilities.

A fourth application 46 of the NSD 16 can perform a comprehensive security assessment of the network 20. The fourth application assesses the operating system of various computers and monitors the network for security vulnerabilities. The fourth application 46 can also provide a report of all security breaches and provide an appropriate solution based on a database of known security vulnerabilities similar to Table 1. However, because vulnerabilities are constantly changing and new ones are being discovered, an efficient means is required to update the database of security vulnerabilities.

A fifth application is responsible for receiving the software enhancements and updating of the database of security vulnerabilities. The following is a discussion of how enhancements are automatically provided immediately and in real-time for a computer security vulnerabilities database.

The Push System

Because network security vulnerabilities are constantly changing and new ones being developed by hackers, a system administrator is required to remain vigilant in order to protect the computer network, clients, and servers from the new system vulnerabilities. The disclosed invention provides a means for obtaining real-time enhancements to a database of security vulnerabilities. In this way, a system administrator or a dedicated network server is able to take immediate action to protect the computer network, clients and servers before a breach occurs. The push system is a method for automatically providing software enhancements in real-time, and is an efficient means for providing enhancements to a database of security vulnerabilities. As described below, the push system is a part of an integrated security system that primarily provides a secure network operating environment. Specifically, the push system is part of a fifth module that receives an update and updates a database of security vulnerabilities.

In one embodiment of the invention, the push system provides computer security software enhancements for execution on at least one computer. The push system automatically implements and electronically sends computer software enhancements over a computer network when the software enhancement becomes available. The software enhancement can include an update to a computer security vulnerabilities database or a new version of an entire computer security software package. In either embodiment of the invention, the software enhancement is automatically distributed over an electronic network.

In an alternative embodiment, the push system is manually activated by a user seeking an update. In this alternate embodiment, the user is able to send a query to a server about the availability of an enhancement which can include an update of the database or a new version. If the enhancement is available, the server either pushes the enhancement over the network to the user or provides a negative response if it cannot push the enhancement for some reason.

The software update can include a combination of old and new information regarding computer security vulnerabilities for inclusion in the database, where succeeding updates primarily add new information to the database. As a result, the information in the database continuously builds. However, if the enhancement is a new version of the computer security software, the new version includes not only the new database of information but also includes new features or functionalities not a part of the original software. Thus, a new version might require overwriting the old database of information or discarding the old version and re-installing a new database.

The push system integrates the software enhancement into existing programs. Additionally, the integration can also perform a check on the integrity and authenticity of the software enhancement provided. This feature determines whether the user being sent the software enhancement is eligible, and checks the integrity and authenticity of the software enhancement. In determining the integrity and authenticity of the software enhancement, the push system can use digital signatures or other cryptographic techniques. In the disclosed embodiment, digital signatures are used to encode the software enhancement by using a signing key, and an authorized local user 6 or customer possesses the correct key for validating the original message.

Figure 3:
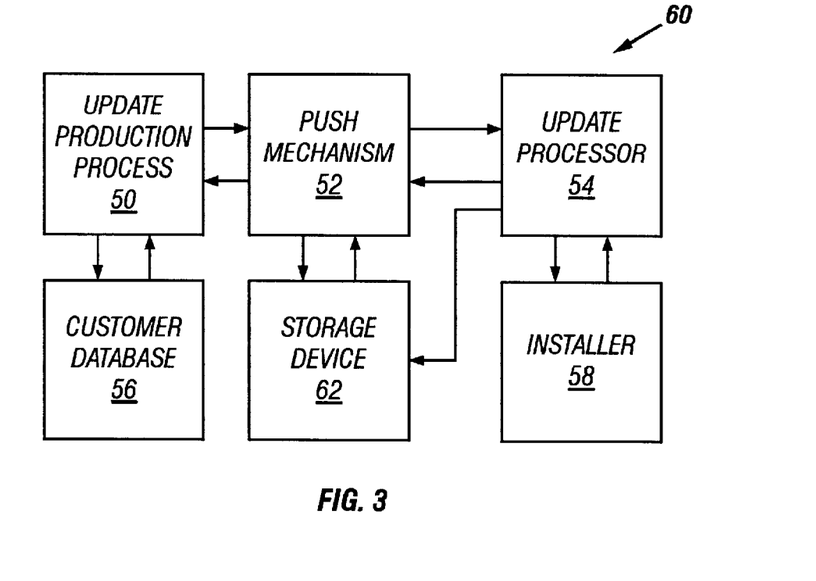
FIG. 3 is a schematic diagram of a "push" system for delivering enhancements to a computer security system.

The push system also installs the software enhancements. The installation includes performing a check on the software enhancement and determining the integrity and authenticity of the software enhancement. Referring to FIG. 3, the push system 60 includes three primary components: an update production process 50; a push mechanism 52; and an update processor 54. The push system 60 also includes a customer database 56 and an installer 58. The following is a description of each component.

The Push Mechanism

Still referring to FIG. 3, the push mechanism 52 delivers the software enhancement to the customer and invokes an installer 58 via the update processor 54. The push mechanism 52 delivers the software enhancement using electronic mail to a small script which places the contents of the push onto a storage device 62. The script is a program written in a high level computer language that a local server 18 may execute. The script can include different commands and subroutines for accessing software applications from various memory locations within the computer. The script may be used to implement storing an update of a database of security vulnerabilities 92 on a storage device 62 and then automatically running an update installation procedure 100.

In the disclosed embodiment, the push mechanism 52 is invoked using an electronic mail message system that is delivered using simple mail transfer protocol (SMTP) which is a standard method for transmitting electronic mail to and from the internet. However, the push mechanism may also use a post office protocol (POP) mail server. As is well known in the art, the POP server behaves much like a post office box. The POP server holds mail for the user, and when the user connects to the POP server, their mail is automatically transferred to them. Thus, in this particular example, the authorized local user 6 could connect to the POP server and the security vulnerabilities enhancement would automatically be pushed onto his computer, server or network.

In another embodiment of the invention, the security vulnerabilities database is delivered using an internet message access protocol (IMAP) mail service. IMAP offers a built-in flexibility that enables an authorized local user 6 to access electronic mail messages from a stand alone computer, workstation, or a laptop computer without transferring files between the computers. Thus a client is able to access remote messages as if they were on a local server 18.

Techniques For Implementing Data Transfer

In a client-server configuration of the network 20, the software enhancements are stored on a server, and the server is able to distribute the software enhancements to a client using a of techniques. In the disclosed invention, the server is remotely connected to the client's network 20. Using the push mechanism 52 as described above, the remote server is able to initiate contact with a client. Client information is obtained from the customer database 56. When the software enhancements become available, the push mechanism 52 is invoked. The push mechanism 52 takes the contents of a specified location within the remote server and sends the software enhancement to the client via electronic mail. As a result, whenever the software enhancement becomes available, it is immediately pushed over a computer network to the client In another aspect of the invention, the client may initiate contact with the remote server by first inquiring whether the software enhancement is available. If the software enhancement is available, that is if there is new information at a specified memory location, then the client is able to receive delivery of the software enhancement. As a result, the client has performed a pull from the server in order to obtain the software enhancements. In another aspect of the invention, the client or another machine acting on behalf of the client may constantly interrogate the remote server about the status of a software enhancement. Similarly, when the software enhancement becomes available it is immediately delivered to the client.

In another embodiment of the invention, the software enhancements are provided using a file transfer protocol (FTP) program. As is well known in the art, FTP allows the direct transfer of files across a computer network. However, unlike the push or pull mechanisms described above, performing an FTP may involve a variety of proxies to facilitate the file transfer. In addition, FTP as a push mechanism would require allowing access to the portion of memory where the software enhancement transfer files are located which would create a network security vulnerability.

In another aspect of the invention, the software enhancements may be automatically sent to an authorized local user 6 or client on a diskette or on a compact disk read only memory (CD-ROM) storage device. However, this technique minimizes being able to immediately obtain enhancements when they become available, and presents logistical problems that should be avoided.

The Update Production Process

In the disclosed invention, the update production process 50 is dedicated to tracking vulnerabilities and maintaining a database of security vulnerabilities. In one aspect of the invention, the update production process 50 identifies and prioritizes the vulnerability, specifies the type of attack, archives the attack source code, creates a report of the vulnerability, and integrates the new attack into a library of known vulnerabilities. The vulnerabilities are tracked from a variety of sources. The sources include mailing lists, internet web sites and information disseminated by hackers. When new vulnerabilities are discovered, they are classified and prioritized. In the disclosed invention, the vulnerabilities are prioritized based on the type of attack using a numerical range from one to ten. The prioritization is based upon the source of the information, the potential damage that the new vulnerability might produce, or the type of attack to which the vulnerability is targeted (e.g., the network, a local attack, or the operating system). The integration of the new vulnerabilities also includes placing the database of known security vulnerabilities in communication with the network security detector 16.

The Installation Procedure

Figure 4A:
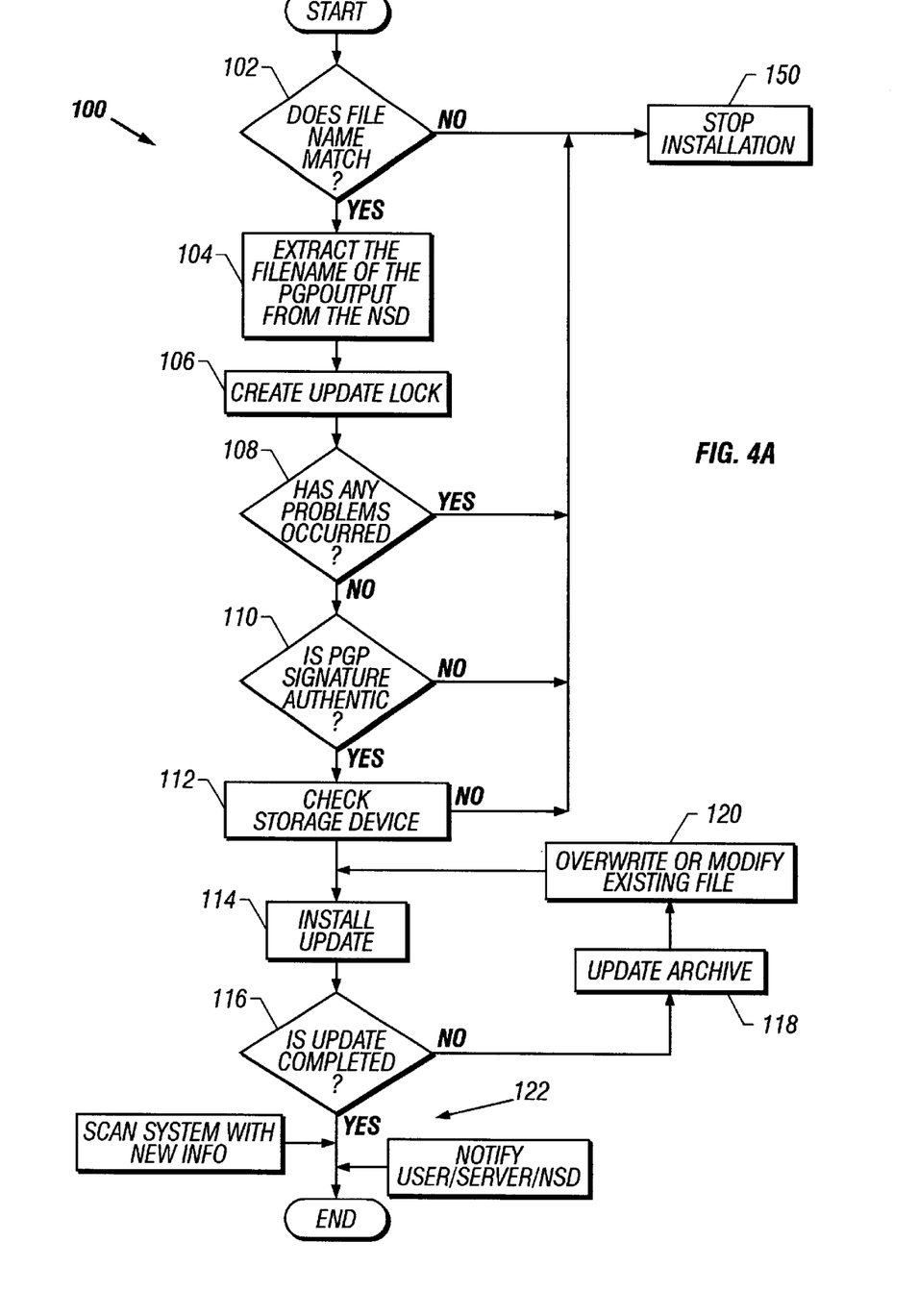
FIG. 4A is a flow chart of a procedure for installing enhancements to a security vulnerabilities database.

In the disclosed invention, the update processor 54 installs the software enhancement when the enhancement is received by the customer. Referring to FIG. 4A, the installation procedure 100 is a means for processing the software enhancement. Note during each step of the installation procedure 100, that if any step fails (Step 108), then the installation procedure 100 stops further installation (Step 150). When the enhancement arrives at an authorized local user's 6 location, the installation procedure 100 installs the software enhancement onto a storage device 62 and performs a series of reliability checks. Prior to installing the software enhancement on a computer or on a local server 18, the authenticity and integrity of the software enhancement is determined. The authenticity checks may occur either at the user's computer or at the local server 18. The authenticity checks include performing a cryptographic technique by verifying digital signatures, authenticating the software, and verifying the user before installing the software enhancement. The installer 58 is always invoked on a temporary disk file and contains no programming code (e.g., hyper-text markup language (HTML) or channel definition format (CDF), etc.). As a result, this feature allows for optimal push channel independence. That is, because the installer 58 can read and receive the software enhancements in any format and from any location, the installer 58 is push channel independent. The installer 58 is usually invoked on a temporary file which contains no network markup from transport layers, such as HTTP or CDF. This method allows for independence from any particular push channel. Alternatively, details regarding push channel independence may be included as processing information.

The installer 58 begins the installation procedure 100 by first ensuring that the filename of the software enhancement matches a predetermined string (Step 102). In another embodiment of the invention, the filename is represented by a string of variables and numbers appended by a suffix that indicates the type of document. The installer 58 then checks for a specific location to extract the filename (Step 104) to a PGP™ output.

Figure 4B:
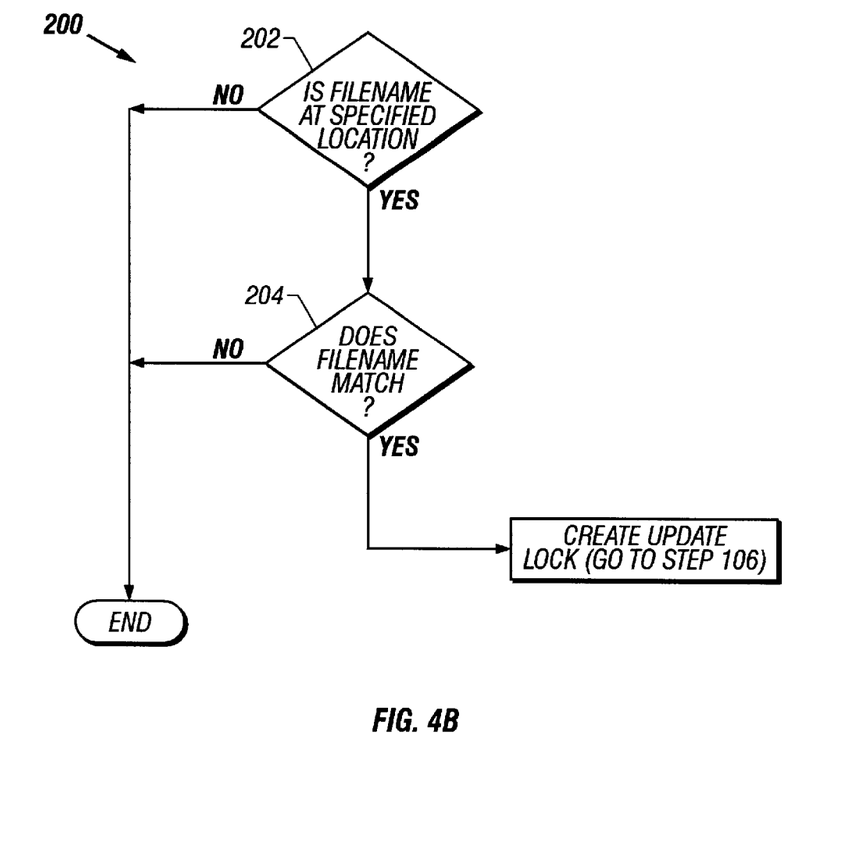
FIG. 4B is a flow chart of a procedure for extracting the filename of a security vulnerabilities database.

Referring to FIG. 4B, the installer 58 performs a filename extraction sequence 200. The filename extraction sequence 200 consists of determining whether the filename of the software enhancement is at a certain location (Step 202) within the software enhancement. If the filename is at the specified location, then the installer 58 extracts the filename and performs a matching sequence (Step 204). After the filename is extracted and matched, the installer 58 creates an update lock (Step 106). Referring to FIG. 4A, the update lock (Step 106) disables any other version of the software enhancement being installed from functioning. The installer 58 then checks for the PGP™ digital signature (Step 110). A digital signature is provided by a software security package residing at a remote location. In the disclosed invention, the remote location is a site residing with the provider of the software enhancement. The remote location includes a computer that maintains all security keys pertaining to the digital signature. As a precautionary measure, that computer is off-line and electrically isolated from the client-server network. As a result, no new security vulnerabilities are created and an additional level of computer network security is provided.

In one embodiment of the invention, the software security package the provides the digital signature is the network security detector 16. In the disclosed invention, the security software package uses Pretty Good Privacy™ (PGP™) encryption for authentication and provides a digital signature to facilitate authentication. A digital signature is a cryptographic function computed as a message and a user's private key. The private key is a number or a mathematical value that is unique to the sender. The signature function produces a value unique to the private key and the fingerprint value being signed. The private key has a mathematically related public key that anyone may use to verify the signature created by the private key.

The message that is signed is typically a condensed version of the actual message produced by a message digest (MD) or hash algorithm. In general, a message digest algorithm, takes as an input a message of arbitrary length and produces a shorter fingerprint of the input. In the disclosed invention, the message digest algorithm used is called MD5 and produces a 128-bit fingerprint. The message digest algorithm is generated by a transformation function that produces a fixed size representation of the original message. The message digest function has the properties that it is difficult to predict the value of the function for a given input, and that it is difficult to find two arbitrary messages with the same fingerprint, or given a fingerprint, it is difficult to find a second value for the given fingerprint.

At the receiving end of the message, the recipient verifies the signature on the message using the public key. After the encoded message is sent and properly decoded, the PGP™ authentication process (Step 110) is completed. The software enhancement package is then sequentially scanned for errors (Step 114–122), and if there is sufficient space (Step 112) on the storage device, the software enhancement is stored on the client's computer, hard drive or server (Step 114).

After storing the software enhancement with the client, the installer 58 updates an archive (Step 118), overwrites any previously existing software enhancement packages (Step 120), and notifies the client or server that the installation procedure 100 is complete (Steps 122). When the installation is complete (Step 116), the installer 58 automatically runs a scan (Step 118) of the network 20 using the newly installed software enhancement to address any new security vulnerabilities uncovered by the installation procedure 100. The update processor 54 also includes solutions for repairing the newly discovered vulnerabilities. The update processor 54 may automatically implement the suggested repairs of the system vulnerabilities and may send a message that the update is completed (Step 122).

In another embodiment of the invention, the installer 58 is able to push source code as a separate enhancement. When the enhancement is received, the source code will not automatically be processed by the update processor 54. However, the update processor 54 may invoke a source code update mechanism that will prompt the user to install the enhancement source code.

An Integrated Security System

The database of security vulnerabilities is part of an integrated system that provides a secure operating environment. The disclosed invention is an integrated system for assessing computer security vulnerabilities The integrated system includes a database of security vulnerabilities and various modules. A first module accesses the database and assesses security vulnerabilities of an operating system of a computer. A second module accesses the database and assesses security vulnerabilities of a computer network that includes the computer. A third module accesses the database and assesses security vulnerabilities in passwords used to access the computer or the network. A fourth module accesses the database and assesses security vulnerabilities of a remote computer connected to the network. A fifth module receives an update to the database and updates the database. A sixth module is a communications module that allows communication between the integrated security system and a similar system.

Figure 5:
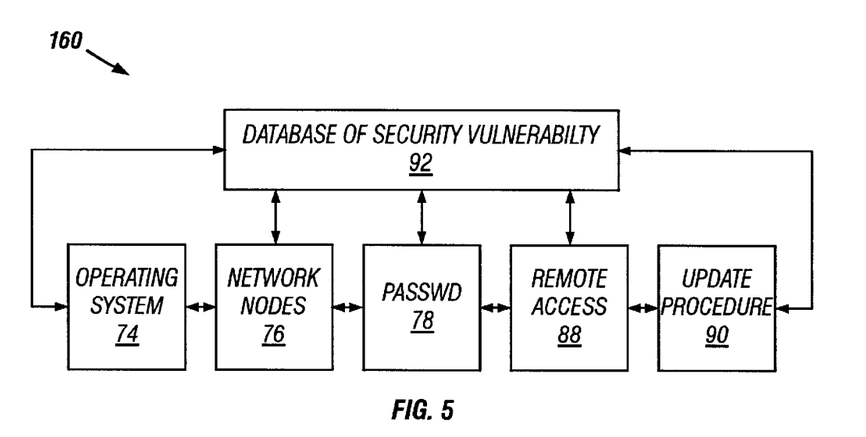
FIG. 5 is schematic diagram of the integrated security system modules for assessing security vulnerabilities on a computer network.
Figure 6:
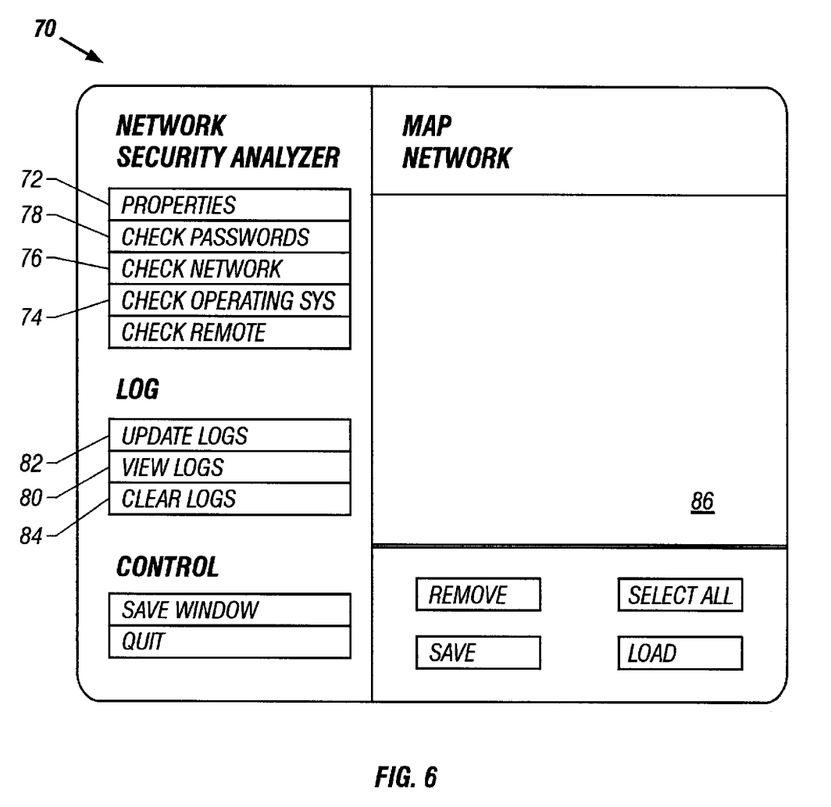
FIG. 6 is a graphical user interface that shows some of the functions presented to a user on a computer monitor, each of the functions relating to assessing security vulnerabilities on a computer and/or a computer network.

Referring to FIGS. 5 and 6, the various integrated security system modules 160 are represented by corresponding symbols on a graphical user interface (GUI) screen 70. The first module 74 is used to check the operating system. The check is invoked by using the check operating systems 74' icon on the GUI screen. The check involves ascertaining whether a user has the correct permission requirements to gain access to the network. Also, in one embodiment of the invention, the first module 74 determines whether all known vulnerabilities have been addressed. Specifically, the first module 74 determines whether the suggested changes resulting from the installation procedure (Step 118) have been made to the operating system.

The first module 78 uses a binary file integrity checking technique using a message digest number 5 (MD5) checksum for files stored on a disk. In the disclosed embodiment of the invention, the checksum is used to verify that no errors have occurred when reading a particular string of bits or a particular file. The checksum value can be any checksum method where it would be difficult to predict the checksum value for a given input. As described below, no two checksums are equivalent, and any changes or corruption of the stored data is detected. Thus, by using a database of MD5 checksum values, the third module 78 is able to determine whether the software enhancement stored on a storage device 62 was modified after a snapshot had been taken, or after the database was created.

The second module 76 accesses the database of security vulnerabilities 92 and assesses network security. The second module 76 connects to a network service, accepts information from the service and interrogates the service. The second module 76 performs a network scan and may be invoked by activating the check network 76' icon on the graphical user interface screen. The network scan produces a map of the network 86 which is essentially an inventory of the Internet Protocol (IP) devices connected to the network. Using network protocol, the integrated system also probes the ports of each of the IP devices for programs that contain security vulnerabilities that may be exploited. The network scan ensures that the network 20 and a local server 18 is protected against any unauthorized access that may penetrate the firewall 12. The network scan for IP devices is invoked using the properties (PROP) icon 72 which enables an authorized local user 6 to configure the various modules.

The third module 78 accesses the database of security vulnerabilities 92 and assess security vulnerabilities in the passwords being used to access a computer or a computer network 20. The third module 78 uses a dictionary of passwords, common English words, and other words to compare and identify vulnerable passwords. The third module may be invoked by an authorized user 7 by activating the check password 78' icon on the graphical user interface screen. When invoked, the third module 78 checks whether the words in a list have been used as passwords.

The fourth module 88 accesses the database of security vulnerabilities 92 and assess the security vulnerabilities of a remote computer connected to the network. The fourth module 88 allows a remote computer to first connect to a network service then accepts information from the service and like the second module 76, also interrogates the service.

The fifth module 90 is for receiving an update to the database of security vulnerabilities 92 and updating the database. As described above, the fifth module 90 includes the installer 58. The fifth module 90 checks the authenticity and integrity of the software enhancement. The authenticity of the software enhancement works for either an update or a new version. The authenticity and integrity of the software enhancement is confirmed using the previously described cryptographic methods with PGP™ output from the network security detector 16. In one aspect of the invention, the fifth module 90 also maintains a record of all transactions.

A sixth module is a communications module that allows the integrated security system 160 to communicate with a similar system over a computer network. The sixth module may allow communication between the similar system and the various modules and software applications for sharing database files, for sharing workload in breaking long lists of passwords, transmitting reports or data for purposes of analysis, reporting to a management station, configuring files or configuring an operating system, and invoking a remote system to send a software enhancement. The sixth module may also include cryptographic code for protecting the confidentiality and integrity of the information being transmitted.

The sixth module may be used for authenticating a user and providing a means for reporting various transactions on the network 20. Specifically, the sixth module may be used to constantly check a user's identification, the integrity of the service connection, and the status of any network processing.

The GUI 70 may also provide a reporting mechanism. The GUI 70 may also include several means for reporting various network transactions. In the disclosed invention, the GUI 70 includes a log view 80 may allow a user to view a text version the update process or log information on a storage device, a log update 82 that generates a report of all security vulnerabilities on the network 20, and a log clear function 84 that allows a user to erase the log.

Figure 7:
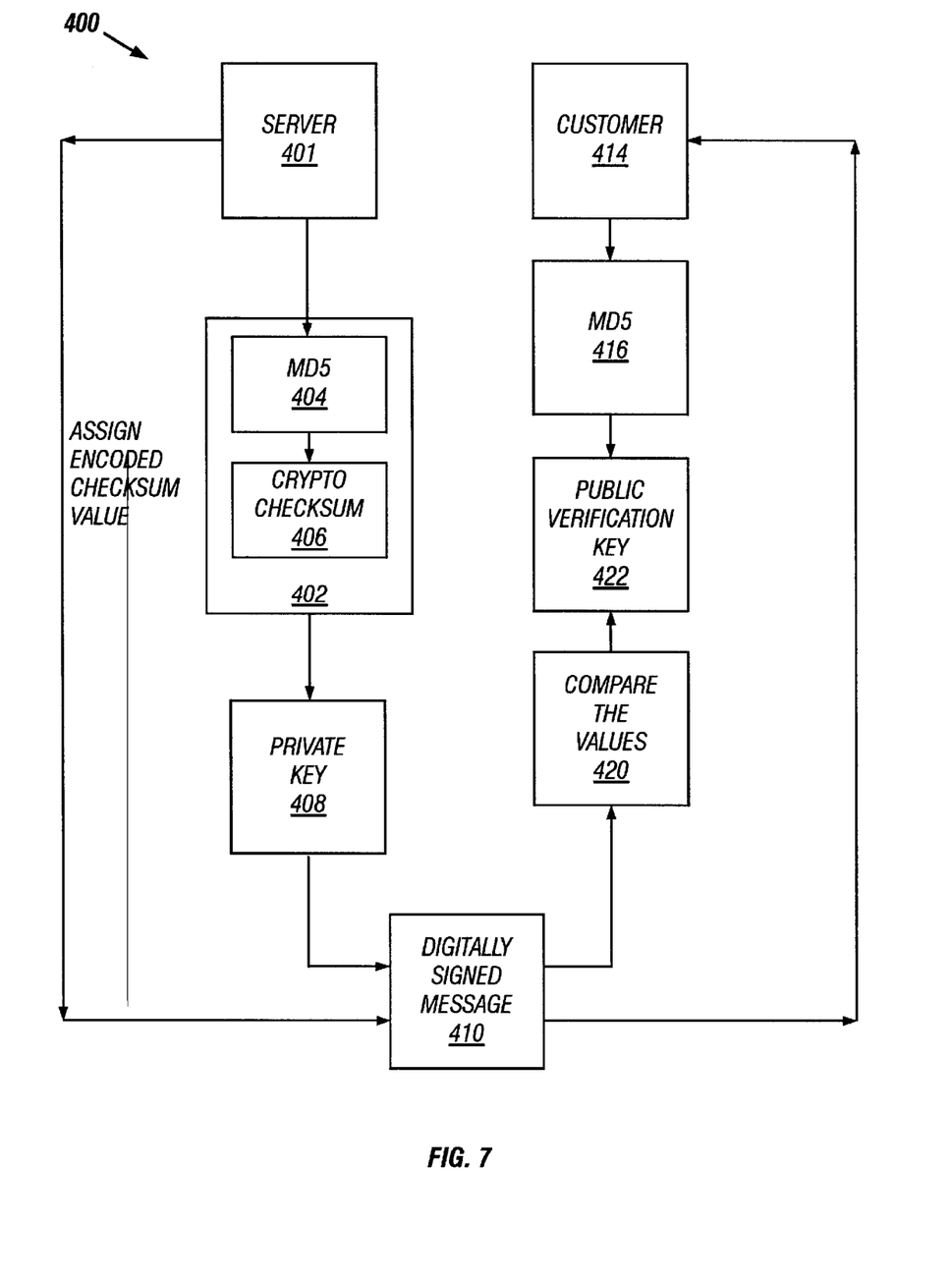
FIG. 7 is a flow chart of a Pretty Good Privacy™ (PGP™) authentication procedure for checking the integrity and authenticity of a software enhancement or update.

Referring to FIG. 7, the PGP™ authentication procedure 400 is described. The fifth module 90 performs a message content authentication and verifies that the software enhancement received is exactly the same as the message sent. The fifth module 90 may employ a cryptographic checksum called a message authentication code, or by using digital signatures. The techniques may be used to verify where the message originated, the sender, and the receiver. As a result, the fifth module 90 is able to verify that the actual sender of the message is the person or server that the sender in the message claims to be.

The fifth module 90 uses an asymmetric cryptosystem wherein the recipient of the message is assured the validity of the sender. The fifth module 90 uses a key distribution center or a public key to verify the place of origination. Alternatively, the fifth module 90 may verify a party's identity by using biometrics. In general, biometrics is a method of authenticating a person's identity by using an electronic transmission of personal identifying characteristics of either the recipient, sender, or both.

Still referring to FIG. 7, the PGP™ authentication procedure 400 used by the fifth module 90 is described further. A server 401 obtains the most recent software enhancement and seeks to deliver a secure copy of the software enhancement to a customer 414. The server 401 includes an MD5 checksum utility program 404. Using the checksum utility program 404, the software enhancement file is compressed into a 128-bit cryptographic checksum 406 and given MD5 checksum value 402. For example, an Intel™ system running DOS or Microsoft Windows™ and an executable file "md5.exe", has a 128-bit MD5 checksum value equal to 374394a3d46c812f5f6db425ad88f57c for the file "md5.exe", Similarly, the software enhancement program is given a MD5 checksum value with a 128-bit representation. As a result, the software enhancement is uniquely marked and the MD5 checksum value 402 is used to distinguish the software enhancement file.

A cryptographic technique is applied to the cryptographic checksum by attaching a private key 408 to the software enhancement file. The private key 408 is a mathematically generated number that is unique to the sender, and is a number that only the sender knows. The software enhancement is then given a digital signature 410 which is a function of the message digest number and the private key 408. The signed message is then delivered to the customer 414. The customer 414 applies an MD5 algorithm 416 to the software enhancement delivered to confirm the cryptographic checksum value 402. The recipient compares 420 the value obtained from the cryptographic checksum with the value obtained by using a (public) verification key 422. If the values are equivalent, then the original PGP™ message delivered was created by the holder of the private key.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An integrated system for assessing vulnerabilities, comprising:
    a database of security vulnerabilities;
    a first module for accessing the database and for assessing security vulnerabilities of an operating system of a computer;
    a second module for accessing the database and for assessing security vulnerabilities of a computer network that includes the computer;
    a third module for accessing the database and for assessing security vulnerabilities in passwords used to access the computer or the network;
    a fourth module for accessing the database and for assessing security vulnerabilities of a remote computer connected to the network; and
    a fifth module for receiving an update to the database and updating the database.

2. The integrated system of claim 1 wherein the first module determines permissions of the operating system.

3. The integrated system of claim 1 wherein the first module determines whether predetermined changes have been made to the operating system.

4. The integrated system of claim 1 wherein the second module connects to a network service and accepts information from the service.

5. The integrated system of claim 1 wherein the second module connects to a network service and interrogates the service.

6. The integrated system of claim 1 wherein the third module checks whether the words in a list have been used as passwords.

7. The integrated system of claim 1 wherein the fourth module allows the remote computer to connect to a network service and accepts information from the service.

8. The integrated system of claim 1 wherein the fourth module allows the remote computer to connect to a network service and interrogate the service.

9. The integrated system of claim 1 wherein the fifth module also checks the authenticity and integrity of the update.

10. The integrated system of claim 9 wherein the fifth module employs a cryptographic technique to check the authenticity and integrity of the update.

11. The integrated system of claim 10 wherein the cryptographic technique comprises a digital signature.

12. The integrated system of claim 1 wherein the fifth module receives the update after a request is made for the update.

13. The integrated system of claim 1 wherein the fifth module receives the update automatically whenever the update becomes available.

14. The integrated system of claim 1 wherein a sixth module is a communications module for communicating with a similar system.

* * * * *